United States Patent [19]
Doi et al.

[11] Patent Number: 5,224,177
[45] Date of Patent: Jun. 29, 1993

[54] HIGH QUALITY FILM IMAGE CORRECTION AND DUPLICATION METHOD AND SYSTEM

[75] Inventors: Kunio Doi, Hinsdale, Ill.; Hitoshi Yoshimura, Kanagawa, Japan

[73] Assignee: The University of Chicago, Chicago, Ill.

[21] Appl. No.: 786,008

[22] Filed: Oct. 31, 1991

[51] Int. Cl.$^5$ .............................................. G06K 9/40
[52] U.S. Cl. ..................... 382/54; 358/458; 382/6; 382/51
[58] Field of Search ............. 382/54, 6, 51, 18; 364/413.17, 413.14, 413.16, 413.19, 413.24; 358/447, 448, 458

[56] References Cited

U.S. PATENT DOCUMENTS

| | | | |
|---|---|---|---|
| 4,189,775 | 2/1980 | Snooge et al. | 382/54 |
| 4,229,764 | 10/1980 | Danos | 382/54 |
| 4,302,672 | 11/1981 | Kato et al. | 382/54 |
| 4,315,318 | 2/1982 | Kato et al. | 382/54 |
| 4,438,495 | 3/1984 | Collins et al. | 382/6 |
| 4,792,900 | 12/1988 | Sones et al. | 382/6 |
| 4,792,979 | 12/1988 | Nomura et al. | 382/51 |
| 4,845,762 | 7/1989 | Higashi et al. | 382/54 |
| 5,048,110 | 9/1991 | Nakajima | 382/54 |

Primary Examiner—Joseph Mancuso
Attorney, Agent, or Firm—Oblon, Spivak, McClelland, Maier & Neustadt

[57] ABSTRACT

A method and system for correcting a non-linear characteristic of an image, wherein an input image is digitized to produce digital image data representative of the image and a histogram of the digital image data is produced. At least a first pixel value characteristic of a variable under which the image was derived is extracted from the histogram. A plurality of non-linear correction curves relating original pixel values to corrected pixel values for different degrees of the variable are stored in a memory, and a particular one of the correction curves is selected based at least in part on the first extracted pixel value and a predetermined corrected pixel value. Corrected image data are then formed utilizing the selected correction curve by correcting each original pixel value of the image to a respective corrected pixel value based on the relationship therebetween defined by the selected correction curve, and a non-linearity corrected image is produced based on the corrected image data.

22 Claims, 17 Drawing Sheets

HIGH QUALITY FILM IMAGE CORRECTION AND DUPLICATION METHOD AND SYSTEM

BACKGROUND OF THE INVENTION

1. Field of the Invention

This invention relates to a method and system for high quality radiographic film duplication, particularly duplication of properly and improperly exposed radiographs.

2. Discussion of the Background

In the intensive care unit (ICU), clinicians require that radiographs of their patients be available for immediate viewing. However, radiologists also require the radiographs for interpretation throughout the day in a controlled environment. In order to resolve this conflict, duplicates of the radiographs are routinely sent to the ICUs at hospitals. However, the quality of the duplicated radiographs, that are made by using conventional optical duplication techniques, is often poor and variable. Thus, a duplication system that can provide consistently high quality radiographs would be useful.

It is well established that about 10% of conventional radiographs are rejected due to poor image quality. Reasons for the rejections include improper density due to over-exposure or under-expose, and poor contrast due to grid misalignment. However, improperly exposed radiographs can be recovered by using digital image processing techniques. Image processing may improve the quality of radiographic images; in fact, radiologists who have become familiar with computed radiography and edge enhanced images, tend to prefer mild digital image processing on digital radiographs (See MacMahon et al.: "Digital chest radiography", *Clinics in Chest Medicine* 12: 19-32, 1991).

SUMMARY OF THE INVENTION

Accordingly, the objects of this invention are to provide a novel method and system which (1) improve the image quality of duplicated images including non-linearities requiring correction; (2) recover improperly exposed radiographs; (3) enhance conventional radiographs using digital processing; and (4) use a digitizer as a front-end device for a picture archiving and communication system (PACS) and for computer-aided diagnosis (CAD).

These and other objects are achieved according to the present invention by providing a new and improved method of correcting a non-linear characteristic of an image, including digitizing the image to produce digital image data representative of the image; producing a histogram of the digital image data; extracting from the histogram at least a first pixel value characteristic of a variable under which the image was derived; storing in a memory a plurality of non-linear correction curves relating original pixel values to corrected pixel values for different degrees of the variable; selecting a particular one of the correction curves stored in the memory based at least in part on the first extracted pixel value and a predetermined corrected pixel value; forming corrected image data utilizing the selected correction curve by correcting each original pixel value of the image to a respective corrected pixel value based on the relationship therebetween defined by the selected correction curve; and producing a non-linearity corrected image based on the corrected image data.

According to the system of the invention, an image derived from, e.g., a conventional radiograph is digitized by a laser film digitizer. Then, the digitized image data are analyzed and corrected for improper exposures, the contrast is modified for low-contrast images, and edge enhancement is performed. Finally, the processed image is printed on film using a laser printer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
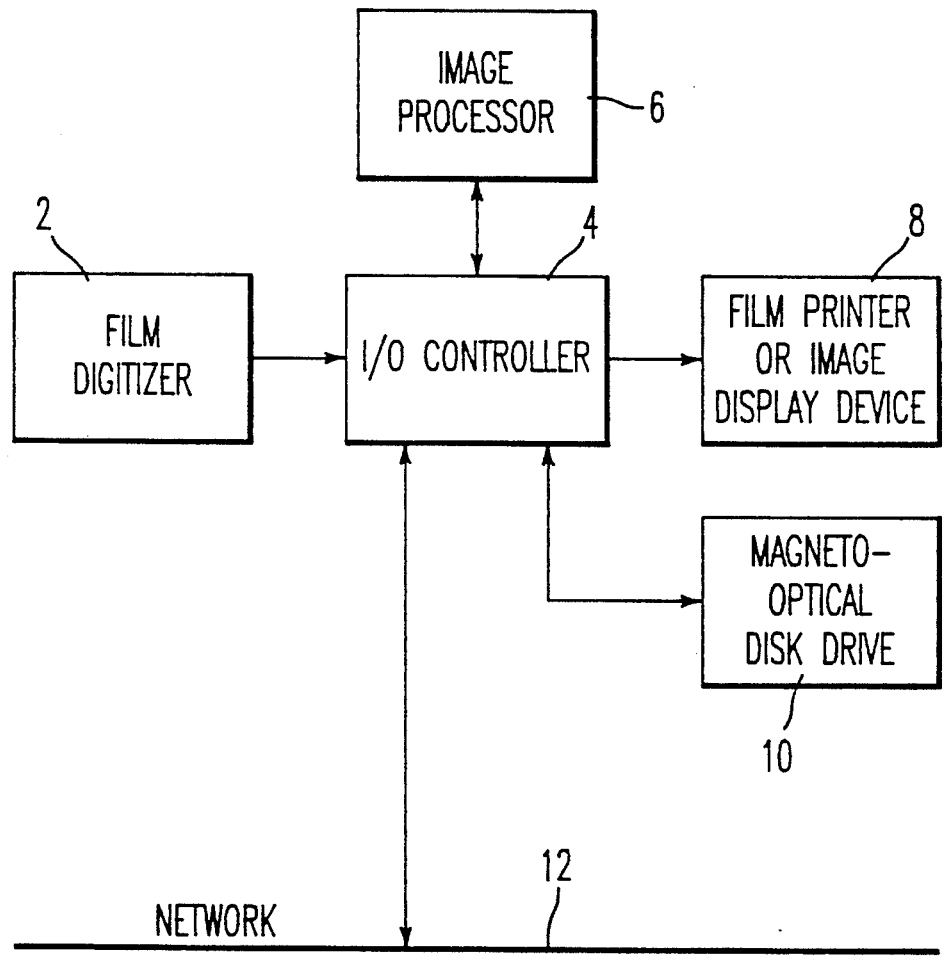
FIG. 1 is a block diagram illustrating the system of the present invention.

Referring now to the drawings, wherein like reference numerals designate identical or corresponding parts throughout the several views, and more particularly to FIG. 1 thereof, the correction system includes a laser film digitizer 2, an I/O controller 4, an image processor 6, a laser film printer or image display device 8 and a magneto-optical disk (10) used to store digitized image data. The system optionally may also be connected to a network e.g. to a PACS or CAD. Regions of interest, corresponding to areas where x-rays have penetrated tissue of interest as discussed hereinafter, in radiographs are digitized into a 2K by 2.5K matrix with a 10 bit gray-scale, using as the digitizer 2 a Konica laser film scanner (Model KFDR-S). The pixel values of the digitized image are approximately inversely proportional to the optical densities in the original radiograph (See Yin et al: "Measurement of the presampling MTF of film digitizers using a curve fitting technique"; *Med. Phys.* 17:962-966, 1990). The digitized image is processed using density correction and mild edge enhancement on a Sun 3/470 workstation serving as the image processor 2, which has a high speed interface (DRV11-WA) to the digitizer and the printer 8 with a transfer rate of approximately 1 MB/sec. Hard copy of the processed image is printed on 8"×10" film using a Konica laser film printer (Model KFDR-P). The linear dimensions of the duplicated images are reduced to exactly one-half those of the original radiographs. The image data are stored on a Ricoh magneto-optical disk, and can be transferred to other computers or devices via an Ethenet network. Total processing time is approximately 3 minutes including digitization, automated density correction, unsharp masking processing, and printing. Without unsharp masking processing, the processing time is reduced to 80 seconds.

For the density correction of improperly exposed radiographs, the present invention employs a nonlinear density-correction technique based on the H & D curve, otherwise known as the characteristic curve, of the original radiographic films (Kodak OC film with Lanex Medium screens). The H & D curve is measured using an inverse square x-ray sensitometer (See Doi: "Basic imaging properties in radiographic systems and their measurements", *Progress in Medical Radiation Physics*, Volume 11, C. Orton ed., Plenum Publishing Corp., pp. 181-248, 1985). The need for the non-linear density correction technique is explained with the aid of FIG. 2.

Figure 2:
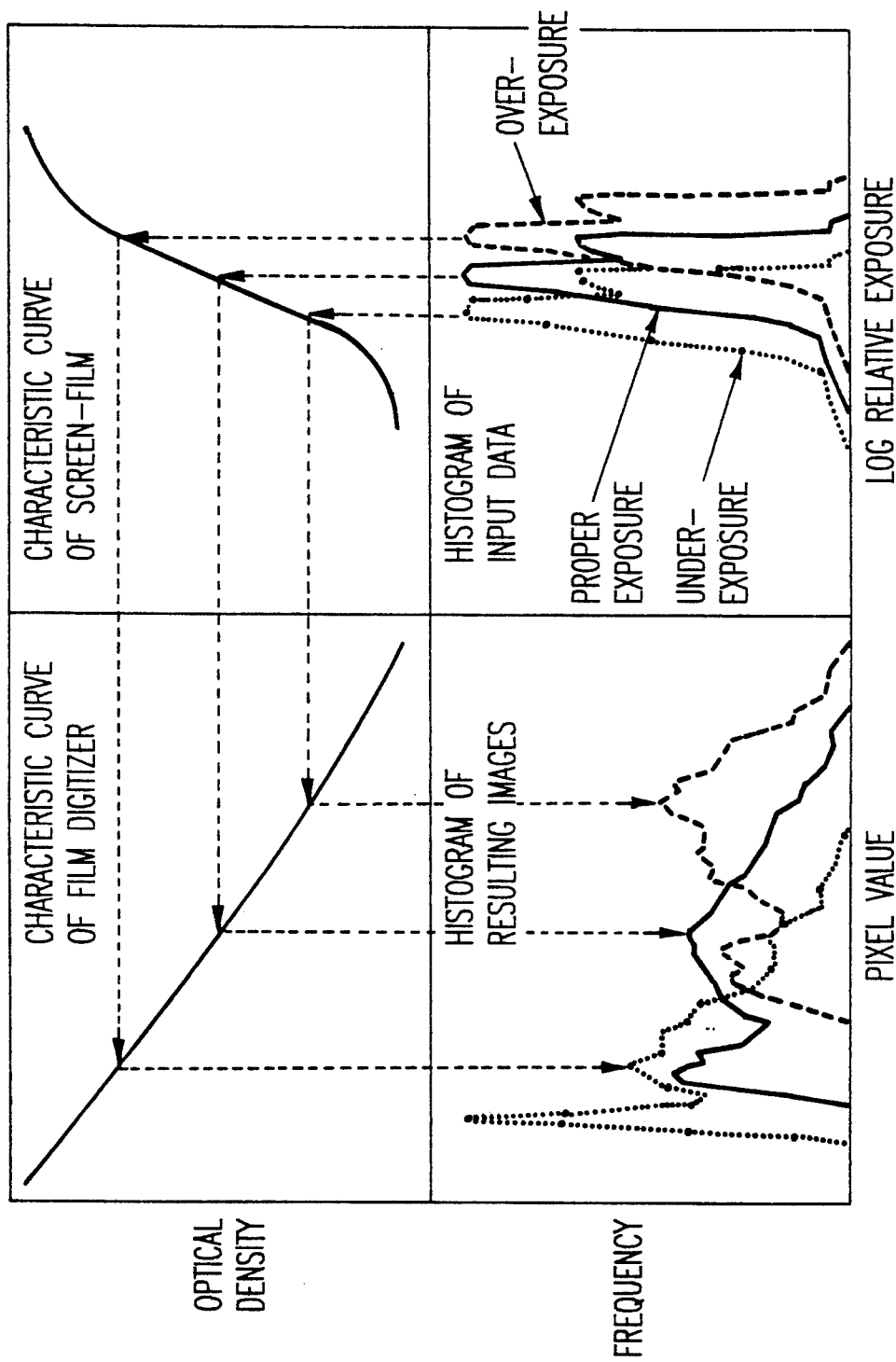
FIG. 2 is an illustration of image data processing, including a comparison of histograms in pixel value of the same patient radiographs taken at three different exposure levels according to the present invention.

As shown in FIG. 2, histograms in input data, in terms of log relative exposure of the same patient obtained at three different exposure levels, will have the same shape. However, the shape of the three histograms in terms of pixel value of the digitized images derived from the radiographs will differ, because of the nonlinear relationship between relative exposure and pixel value. Therefore, FIG. 2 clearly indicates that would be difficult to recover a proper density distribution from an improperly exposed radiograph by using a linear correction technique in which the density of the resulting image is linearly changed, pixel by pixel, in proportion to the density of the radiograph.

Figure 3:
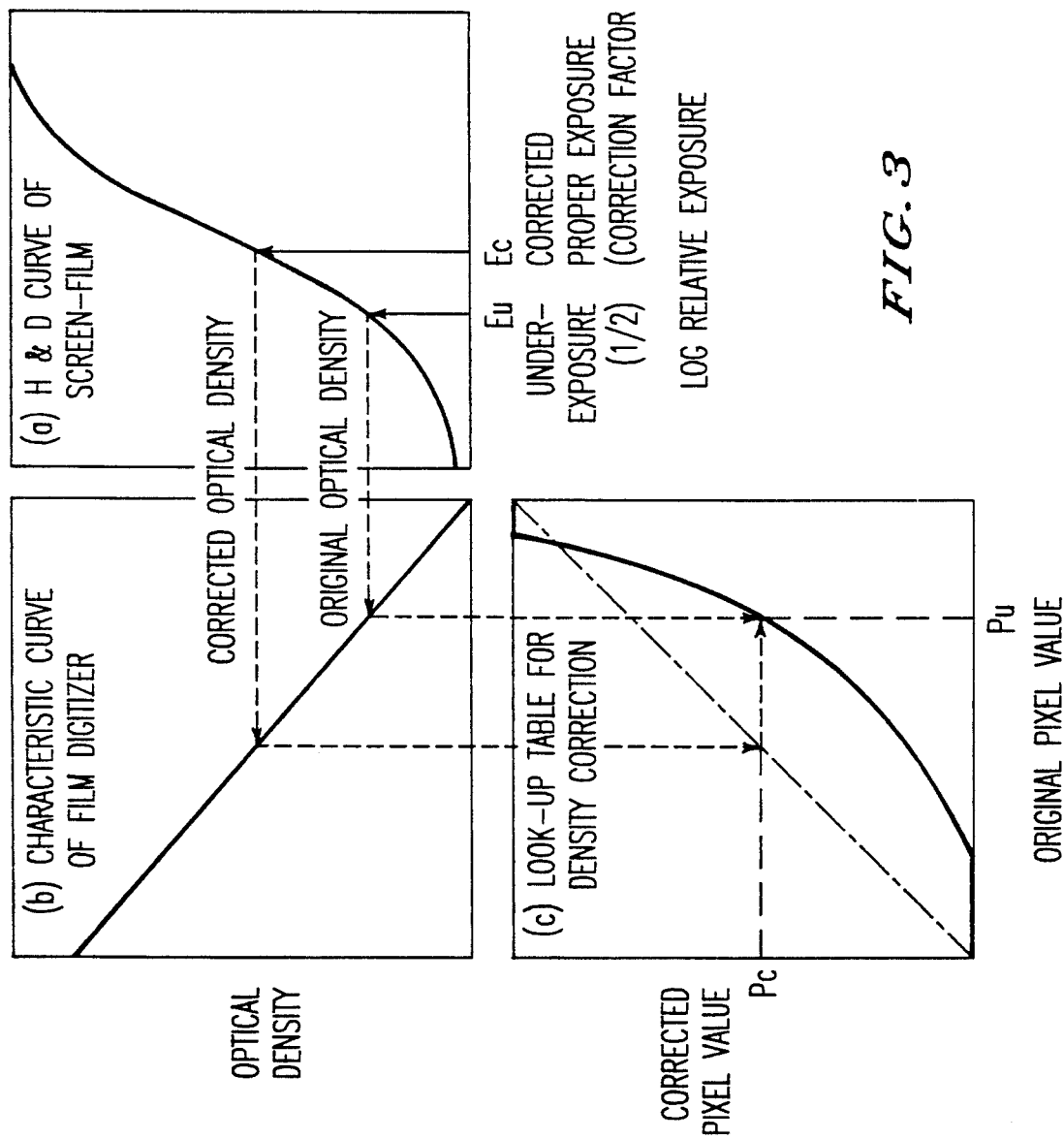
FIG. 3 is a graphical illustration of the determination of a look-up table for nonlinear density correction of improperly exposed images.

According to the present invention, the nonlinear relationship (i.e., mapping function provided by look-up tables) between pixel values of an improperly exposed image and those of a properly exposed image are determined. FIG. 3 illustrates how, according to the present invention the lookup table for density correction of an improperly exposed image is determined. For example, in an underexposed case that is assumed to be acquired with one half of the proper exposure, the pixel value $P_u$ in the digitized image is obtained from the log relative exposure value, $E_u$, by using the H & D (characteristic) curve of the original radiograph (FIG. 3(a)) and the characteristic curve of the film digitizer (FIG. 3(b)). The corrected log relative exposure value, $E_c$, can then be obtained by simple addition of the correction factor that is 0.3 (i.e., log 2) to $E_u$ in this one-half-proper exposure case. The corrected log relative exposure value is converted to the corrected pixel value by using the same characteristic curves. Thus, for a given degree of improper exposure, e.g., one-half of the proper exposure, the mapping between the original pixel values in the digitized image and the "corrected" pixel values in the "recovered" image can be determined as shown by the curve in FIG. 3(c).

Figure 4:
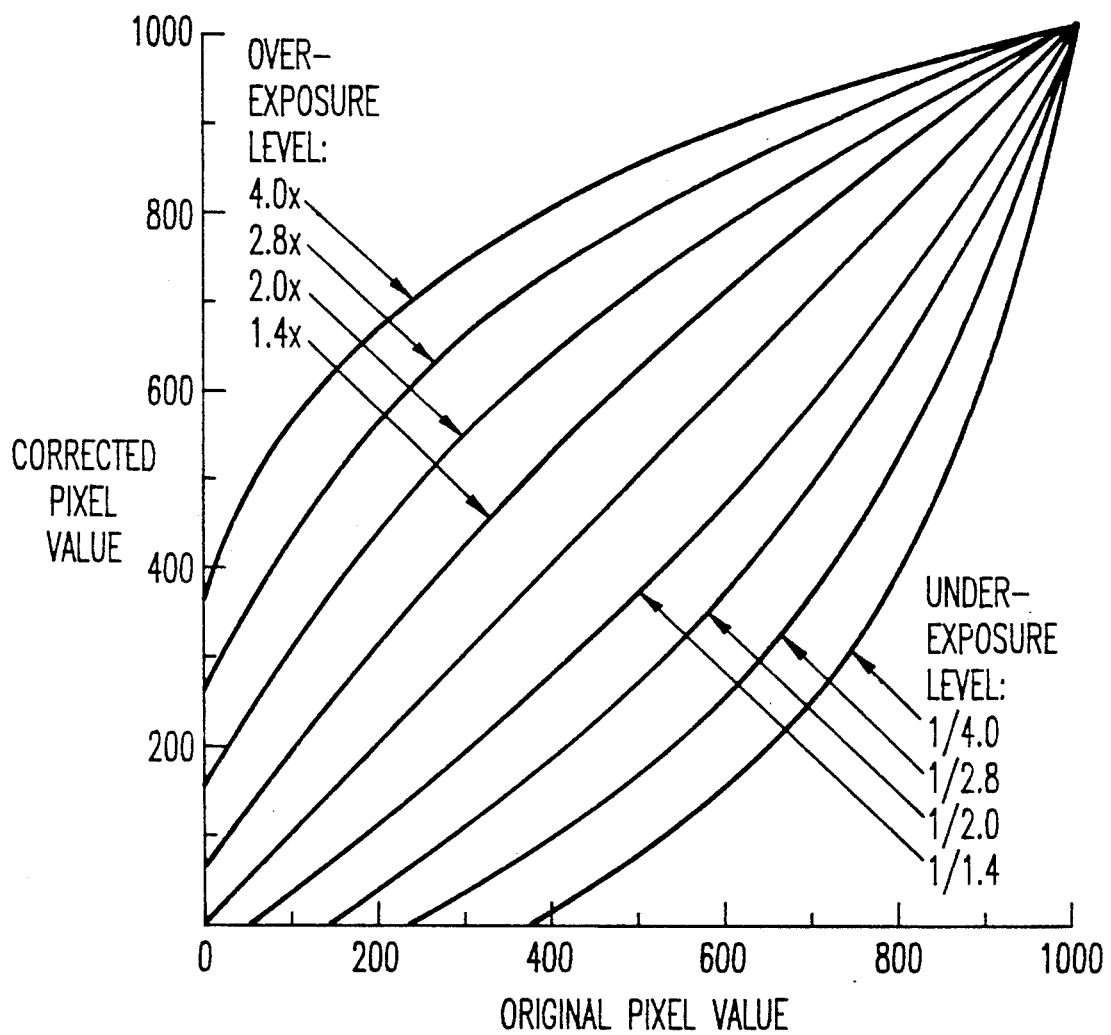
FIG. 4 is a graphical illustration of look-up tables of a nonlinear technique for density correction of improperly exposed images.
Figure 5:
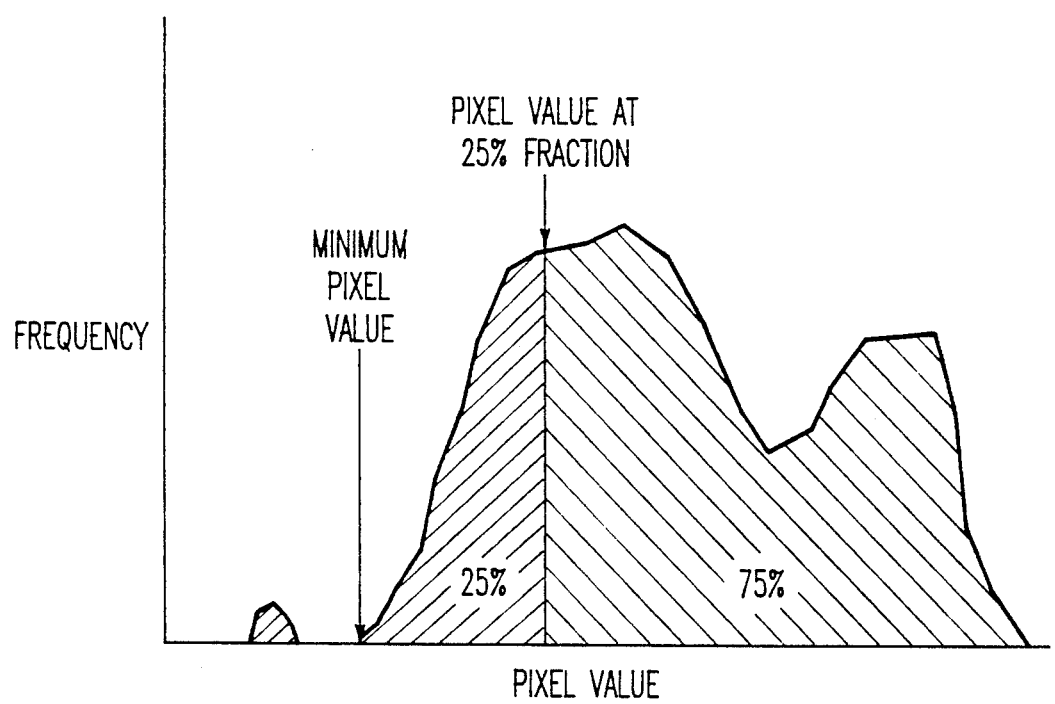
FIG. 5 is a graph illustrating two measures used in the estimation of exposure level of improperly exposed radiographs.

In a working embodiment of the present invention, sixteen look up tables were prepared for density correction of improperly exposed radiographs that ranged from one quarter to four times the proper exposure levels; this exposure range (¼-4) for correction was equally divided on log scale with an increment of $(2)^{\frac{1}{4}}$. The present invention is referred to as a nonlinear density-correction technique, since the pixel values in digitized radiographs are converted to the corrected pixel values, whereas the previous technique was a linear density-correction technique. FIG. 4 shows the relationships between the pixel values in a digitized radiograph and the corrected pixel values. For illustration, only eight curves are shown to indicate the contents of look up tables. It should be noted that the correction factor for improperly exposed radiographs must be known (or estimated) prior to the use of this nonlinear density-correction technique in order to determine which correction curve to employ for a particular exposure condition.

Figure 6A:
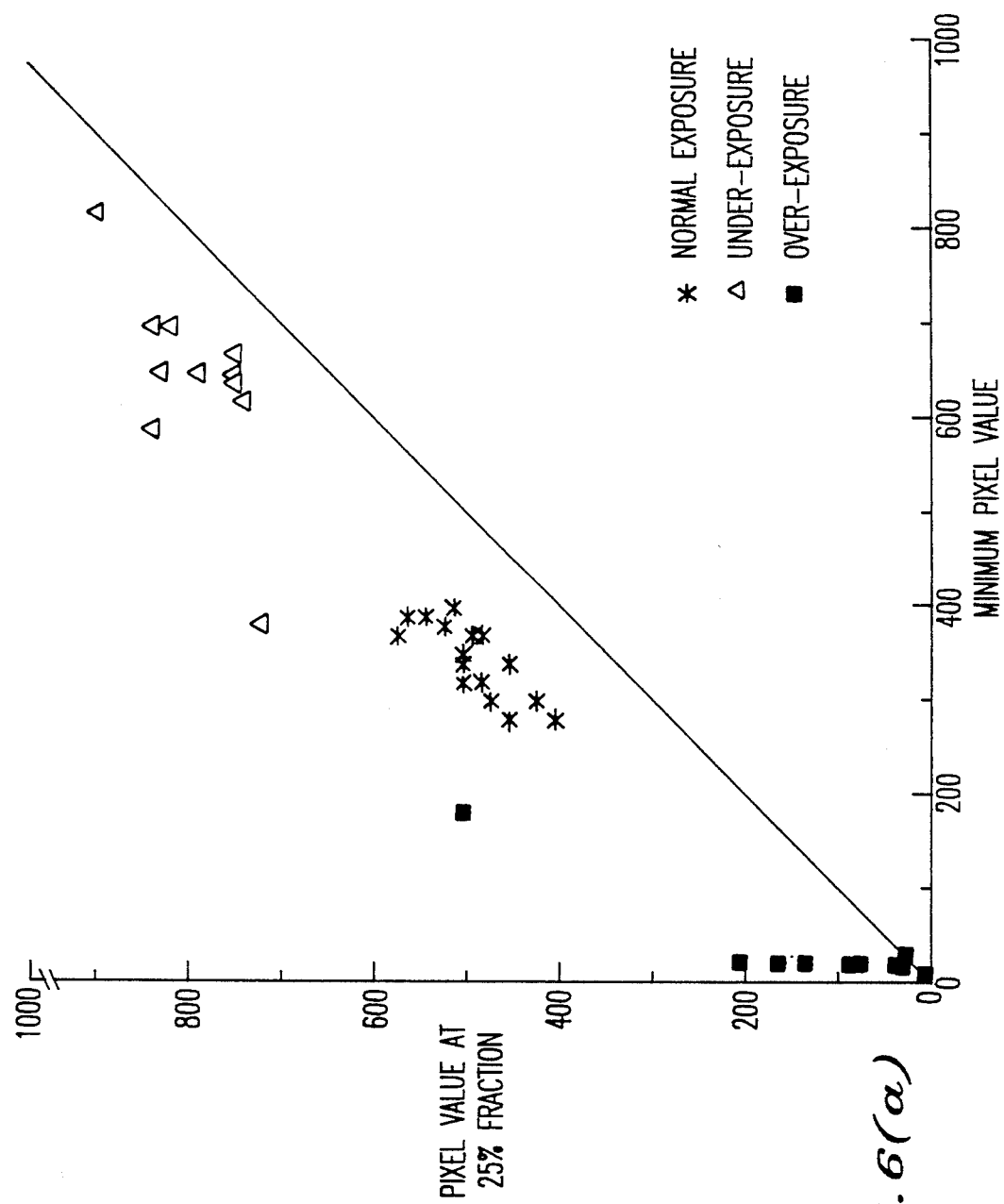
FIGS. 6(*a*) and 6(*b*) are graphs illustrating distributions of the two measures of 90 and 200 chest radiographs, respectively, at three types of exposure levels.

In order to estimate an exposure correction factor for an improperly exposed radiograph, according to the present invention histogram analysis is employed. The histograms of 90 PA chest radiographs, which included 30 properly exposed cases and 60 radiographs rejected due to under or over-exposure were analyzed. For chest radiographs, the density of the lung regions is usually the most important indicator for evaluation of proper exposure. The lung regions, which are generally the dark areas in original radiographs, correspond to the lower pixel values in the digitized image. Therefore, two measures obtained from lung areas in digitized chest images have been selected for the estimation of exposure level, as shown in FIG. 6(a). One measure is the pixel value that yields the 25% fraction of the lower end (higher optical density) of the gray-level histogram of the image. The other is the minimum pixel value (corresponding to the maximum optical density in the lung areas) with non-zero contributions in the main part of the histogram. It is possible to employ other measures such as the median pixel value, the average pixel value, the peak pixel value, and the maximum pixel value of the histogram, as well as the fraction of high pixel values and the fraction of low pixel values. However, results obtained with these measures were comparable to or inferior to these obtained with the pixel value at the 25% fraction and the minimum pixel value.

FIG. 6(a) shows the distribution of the two measures for three types of radiographs, i.e., properly, under- and over-exposed cases. It is apparent that according to the present invention the three types of radiographs can be distinguished in FIG. 6(a) in that the minimum pixel value can be used for selection of a proper look-up table, thus providing an estimation of exposure level, as discussed below.

Figure 6B:
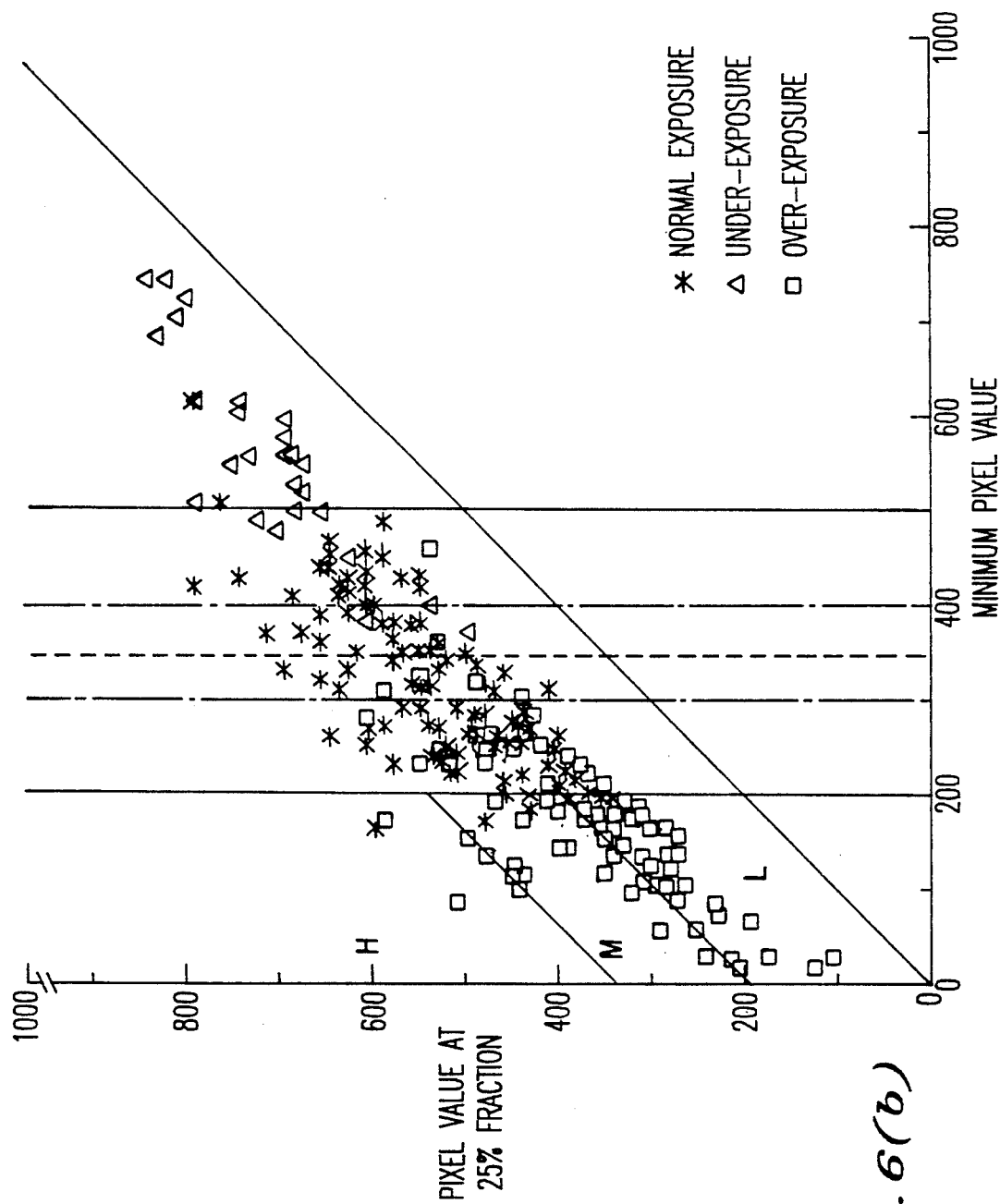

Referring again to FIG. 6(a), for density correction of an improperly exposed radiograph with the minimum pixel value below 200 (threshold level corresponding to over-exposure) or above 500 (threshold level corresponding to under exposure), the minimum pixel value of the radiograph is to be converted to approximately the mean of the minimum pixel values obtained from properly exposed radiographs (here corresponding to 350). Thus, the curve or look-up table (one of those shown in FIG. 4), which best converts the minimum pixel value in the improperly exposed image to this mean minimum pixel value of 350, i.e., the correction curve closest to the intersection of the original pixel value and the empirically determined corrected pixel value of 350, is chosen as the curve to map the pixel values for pixels throughout the image to the corrected pixel values. These two threshold levels (200 and 500) and the mean pixel value (350) were empirically determined by analysis of an additional 200 chest radiographs which were not rejected in routine clinical studies due to "proper" density appearance, the data of which are shown in FIG. 6(b).

In addition, according to the present invention, it has been found from detailed analysis of over-exposed images that it is very useful to employ a more refined technique as described in connection with FIG. 6(b). With this technique, over-exposed images in the range of the minimum pixel value from 0 to 200 are divided into three regions in terms of high, medium, and low pixel values at 25% fraction, as marked by regions H, M, and L. respectively.

The region H includes the area above the diagonal line starting from 350 of the pixel value at 25% fraction and with the minimum pixel value between 0 and 200. The region M includes the area between the two diagonal lines starting from 350 and 200 of the pixel value at 25% fraction. The region L includes the area between the two diagonal lines starting from 0 and 200 of the pixel value at 25% fraction.

For density correction of an over-exposed image in the region L, M, and H, the minimum pixel value of the radiograph is converted to the pixel value of 400, 350, and 300, respectively. In other words, a correction curve shown in FIG. 4 is selected based on the intersection of the minimum pixel value and a selected corrected pixel value of 400, 350 or 300 in dependence of the 25% fraction for those overexposed images having a minimum pixel value less than 200. This refined technique is devised because an over-exposed radiograph with low pixel values at 25% fraction tends to be more over-exposed than that with high pixel values at 25% fraction when the minimum pixel values of two over-exposed radiographs are identical.

Chest radiographs usually include a dark background area that corresponds to regions outside of the human body. These dark areas could cause an error in the estimation of the actual exposure level. In order to eliminate these regions from the histogram analysis, the gray level histogram is calculated only within a selected region of interest (ROI) in the center of the image with an area that is equal to one quarter of the entire image area; the dimensions of this ROI are one half those of the radiograph. In general, the lung regions of most chest radiographs, including upright and landscape PA projections as well as lateral projections, are located in the central area of the radiographs. A portion of the mediastinum is located in this ROI also.

In addition to density correction, global and local contrast of the radiographs are adjusted by contrast and edge enhancement, respectively. Contrast is determined by calculating the histogram of the density corrected image data to determine whether the corrected image is very low in contrast due to grid misalignment, and also if so, whether global contrast correction is required. This can be achieved by determining a predetermined measure of "width" or spread of the histogram over the pixel values, since the low contrast image tends to have a narrow width of the histogram. Therefore, if this "width" measure, such as the width at the half maximum (FWHM) of the histogram is below a predetermined threshold value, then according to the present invention the corrected image is further processed to enhance contrast.

Global image contrast is enhanced by increasing the gradient of the characteristic curve of the film digitizer. This is achieved by rotating the characteristic curve by a fixed amount about a pivot point, i.e., a pivot pixel value. This mapping of the original pixel values to new pixel values is a linear transformation and is equivalent to the linear density- correction technique. With this technique, the pixel values of the image above a pivot point, which is a predetermined pixel value, are increased by a predetermined factor in proportion to the pixel value. The pixel values of the image below the pivot point are decreased by the same factor in proportion to the pixel value. At present, global contrast enhancement is made manually on selected cases, since the number of cases which may require this enhancement is relatively small.

Edge enhancement is performed in the density and contrast corrected image using unsharp mask filtering (See Ishida et al: "High-quality radiographic images: Improved detection of low-contrast objects and preliminary clinical studies"; RadioGraphics 3:325-338, 1983 and Loo et al: "Investigation of basic imaging properties in digital radiography. 4. Effect of unsharp masking on the detectability of simple patterns"; Med. Phys. 12:209-214, 1985). The weighting factor and mask size are selected depending on the type of examination (chest, abdomen, or others).

Figure 7:
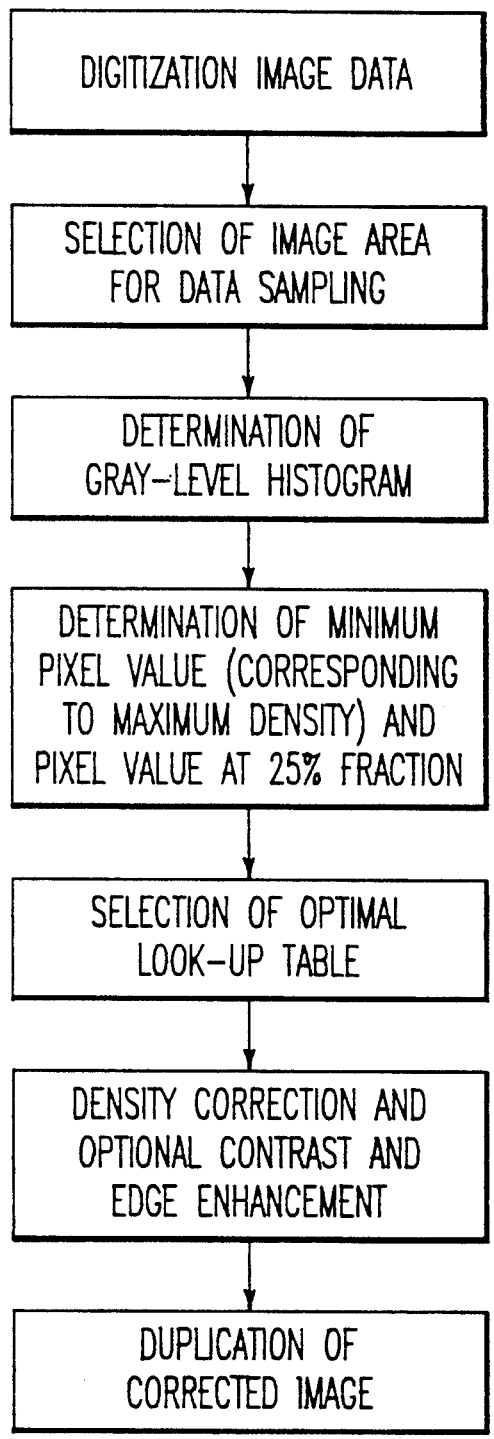
FIG. 7 is a flow chart illustrating the processing steps carried out according to the density correction method of the present invention.

FIG. 7 is a flow chart illustrating steps of the method of the present invention. In step 100, radiographic image data are digitized and in step 110 the ROI is selected. In step 120 a gray-scale histogram of the ROI image data is produced and analyzed in step 130 to determine the minimum pixel value corresponding to maximum density and the pixel value at the histogram 25% fraction. Once these pixel values are determined, they are used to select an optimum correction curve, as above discussed in relation to FIG. 4, in step 140. Then, the original image is corrected using the selected correction curve, and optionally further corrected for contrast and/or edge enhancement (step 150). The corrected image is then duplicated, either by visual display or by means of an image printer (step 160).

The duplication system of the present invention has been evaluated both in terms of physical image quality and with actual clinical cases. In the preliminary clinical evaluation, cases rejected due to under- or over-exposure were processed by the system of the present invention. The "recovered" duplications were evaluated subjectively by radiologists in terms of whether they were adequate for diagnosis, in terms of pulmonary and mediastinal detail. In the physical evaluation, the modulation transfer function (MTF) (See Doi et al: "Modulation transfer function of screen-film systems; *ICRU* Report 41, p. 1-56, published by International Commission on Radiation units and Measurements, Bethesda, Md., 1986) and noise Wiener spectrum (See Doi et al: "MTFs and Wiener spectra of radiographic screen-film systems"; Volume 11, HHS Publication FDA 86-8257, pp. 1-100, 1986) of the duplication system were measured and the results were compared with those of a conventional screen-film system and a Toshiba Computed Radiography system (CR).

Results

FIGS. 8(a)-8(e) show phantom images obtained with three different exposure levels using 1 mAs, 4 mAs, and 16 mAs at 90 kV corresponding to under-, proper, and over-exposure, respectively. Two different density-correction techniques were applied to these images. Density-corrected images with the linear technique are shown in FIGS. 8(f) and 8(g). With this correction technique, both of the improperly-exposed images appear similar, in general, to the correctly-exposed image in the mid-density range. However, for the under-exposed image, the lung regions have higher contrast than in the properly-exposed image, and in the lower density regions the contrast is low. The corrected over-exposed image exhibits lower contrast in the higher density regions and higher contrast in the lower density regions than does the properly-exposed image.

Figure 8B:
FIGS. 8(*a*), 8(*b*), 8(*c*), 8(*d*), 8(*e*), 8(*f*) and 8(*g*) are photographs respectively illustrating effects of nonlinear density-correction methods: (a) under-exposed image (1 mAs), (b) correctly exposed image (4 mAs), (c) over-exposed image (16 mAs), (d) recovered under-exposed image by using nonlinear density-correction technique, (e) recovered over-exposed image by using nonlinear density-correction technique, (f) recovered under-exposed image by using linear contrast enhancement, and (g) recovered over-exposed image by using linear contrast enhancement.
Figure 8A:
Figure 8D:
Figure 8C:
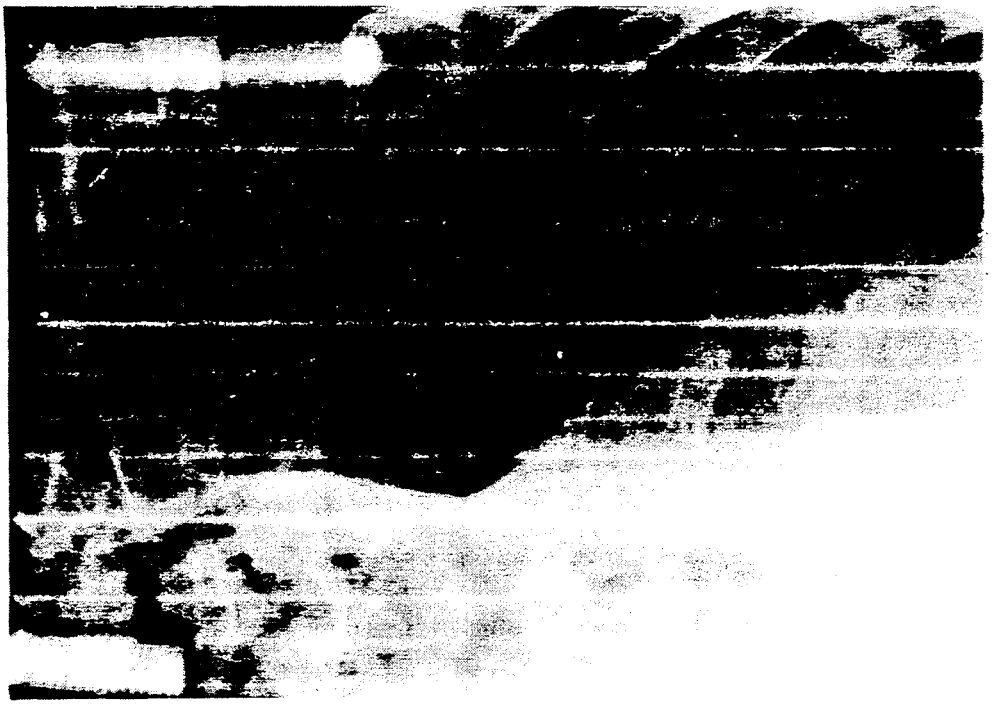
Figure 8F:
Figure 8E:
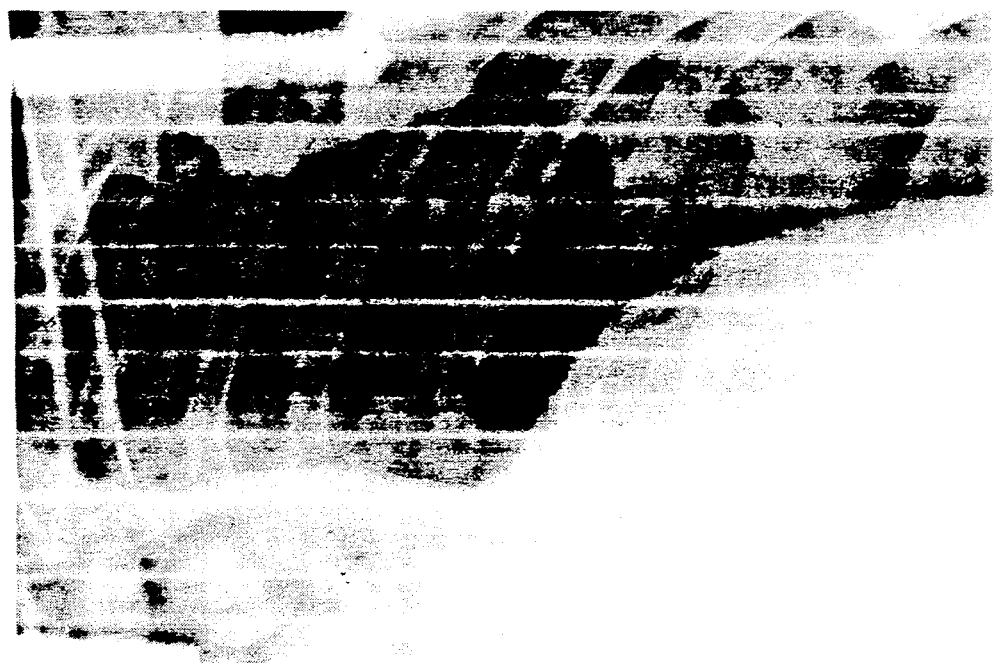
Figure 8G:

FIGS. 8(d) and 8(e) show images recovered by the nonlinear density-correction techniques. The recovered images now appear very similar to the properly exposed images in density and contrast at both high and low density regions. It should be noted that the unique advantage of the nonlinear density-correction technique compared with the linear technique is its capability of reestablishing the overall density distribution to provide an appearance comparable to that obtained with a properly exposed radiograph.

Figure 9B:
FIGS. 9(*a*) and 9(*b*) are photographs respectively illustrating an over-exposed PA chest radiograph (a) and its recovered image (b)
Figure 9A:

FIG. 9(a) shows an example of an over-exposed image that was obtained with four times over-exposure, of an adult male patient with hyperinflated lungs due to chronic obstructive pulmonary disease. The quality of the corrected image shown in FIG. 9(b) is excellent, despite severe over-exposure of the original radiograph, which had an optical density of 3.2 in the darkest area of the lungs.

Figure 10B:
FIGS. 10(*a*) and 10(*b*) are photographs respectively illustrating an under-exposed lateral chest radiograph (a) and its recovered image (b)
Figure 10A:

The same density correction method was applied for lateral chest radiographs. FIG. 10(a) shows an under-exposed chest radiograph and FIG. 10(b) shows its recovered duplicate. Small pleural effusions are demonstrated. Note the improved pulmonary and mediastinal detail.

In order to evaluate the usefulness of the automated nonlinear density-correction technique, the digital duplication system of the present invention was used for all chest radiographs rejected due to improper exposure over a three week period in the Department of Radiology; Kurt Rossmann Laboratories for Radiographic Image Research, University of Chicago. These included standard and portable radiographs. OC film and Lanex Medium screen were used in all cases with 125 kV, 12:1 grid (standard) or 90 kV, 6:1 grid (portables). The rejected radiographs included 62 over-exposed and 25 under-exposed films. By using the nonlinear density-correction technique, 54 over-exposed and 21 under-exposed chest radiographs were corrected to normal density such that they were judged usable for diagnosis.

Thus, the total recovery rate was 86.2%. The inventors have also employed the duplication system for rejected abdominal cases. Seventeen over-exposed and 20 under-exposed radiographs (TMG film and Lanex medium screens) were processed. Sixteen over-exposed and 14 under-exposed radiographs were recovered. The total recovery rate was, therefore, 81.1% for abdomen radiographs.

Figure 11:
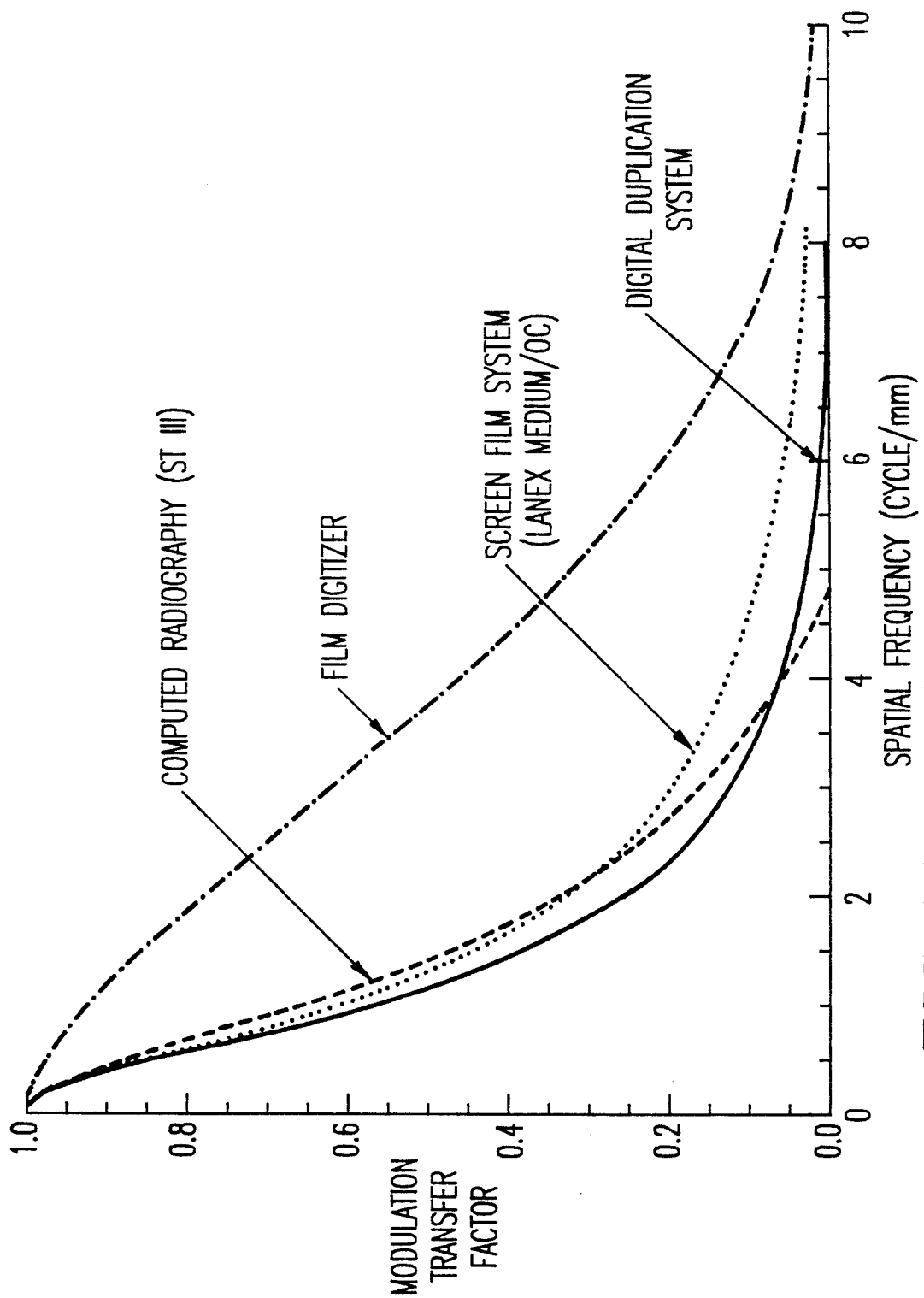
FIG. 11 is a graph illustrating the modulation transfer functions of the duplication system, computed radiography system, conventional screen-film system, and laser film digitizer.
Figure 12:
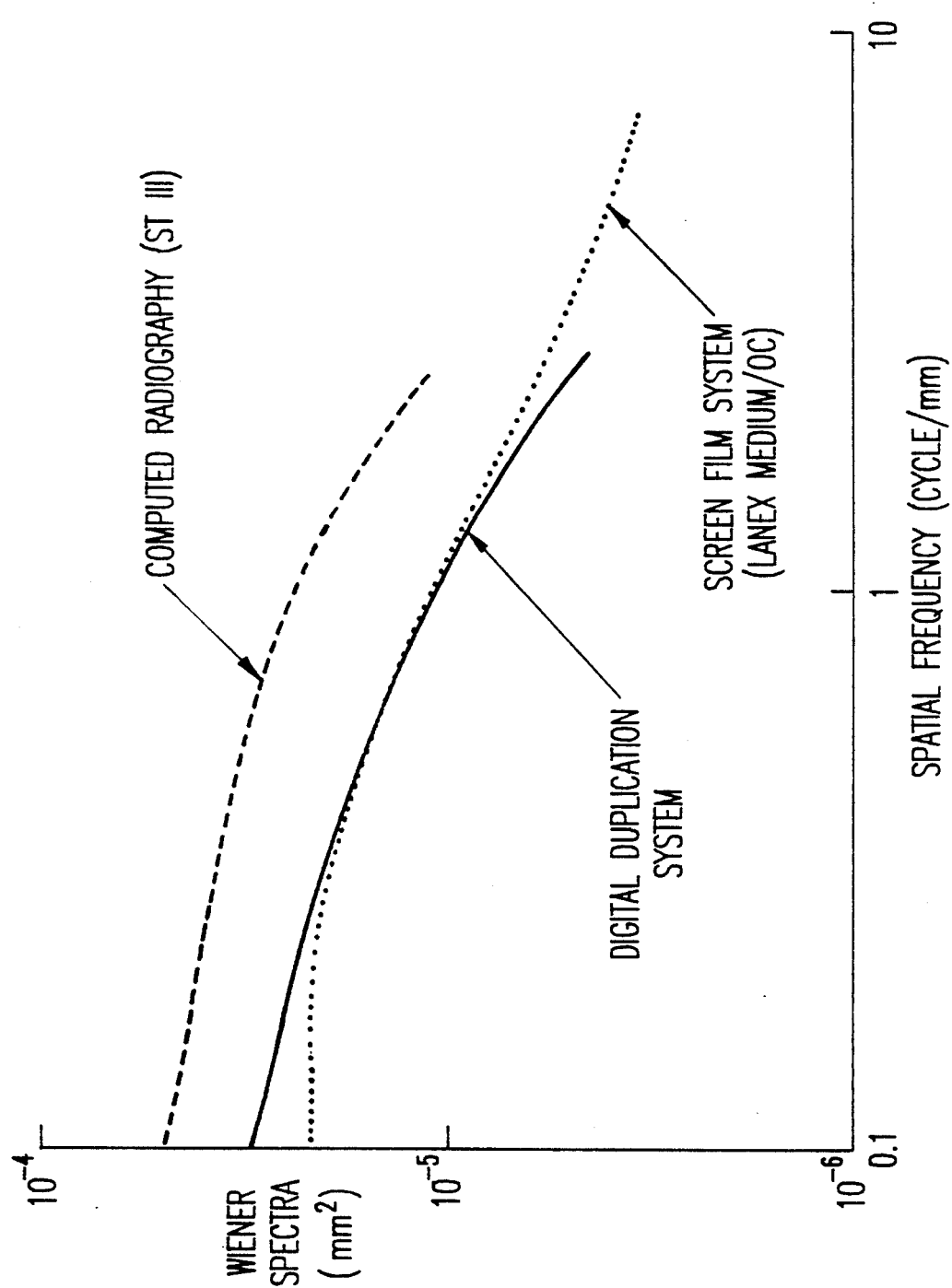
FIG. 12 is a graph illustrating noise Wiener spectra of the present duplication system, computed radiography system, and conventional screen-film system.

In order to evaluate the image quality of the digital duplication system, the imaging properties of resolution and noise of the duplication system, a storage phosphor computed radiography (CR), and a Lanex medium/OC screen-film system were evaluated using the MTF (See Doi et al: "Modulation transfer function of screen-film systems; *ICRU* Report 41, p. 1-56, published by International Commission on Radiation units and Measurements, Bethesda, Md., 1986) and noise Wiener spectrum (See Doi et al: "MTFs and Wiener spectra of radiographic screen-film systems"; Volume 11, HHS Publication FDA 86-8257, pp. 1-100, 1986), respectively. FIG. 11 shows that the MTF of the laser digitizer is the highest. The MTF of the duplication system is given by the product of the screen-film MTF and the film digitizer MIT. The CR system has the highest MTF at low spatial frequencies. For high spatial frequencies, however, the duplication system is superior to the CR system. FIG. 12 shows the Wiener spectrum of the duplicated film, the screen-film system, and the CR system. The noise level of the duplicated film is comparable to that of the screen-film system and about half of that obtained with the CR system.

Figure 13B:
FIGS. 13(*a*) and 13(*b*) are photographs respectively illustrating comparison of duplication image and CR image: (a) digital duplicate of conventional film and (b) computer radiography image of human chest.
Figure 13A:

Digital duplication and CR images of a normal chest were obtained using normal exposure (FIG. 13). These images appear to be comparable, although the CR image is noisier than the duplication image, consistent with the higher level of the Wiener spectrum for the CR system.

Table 1 presents a comparison of the digital duplication system, the computed radiography system, and the conventional screen-film system. In a comparison of image quality, the screen-film system has highest overall spatial resolution. In the low frequency range, the CR system has the highest MTF; however, the overall spatial resolution of the CR system is relatively poor when compared with the other two systems. In addition, the CR system is about two times noisier than the other systems. The image quality of images produced by the digital duplication system is almost comparable to that of the original radiographs, and with density correction superior in cases. A unique aspect of the computed radiography system is its wide dynamic range. However, the digital duplication system also provides this feature in the range of approximately a quarter to four times the proper exposure level, provided that an accurately aligned antiscatter grid is used in combination with a moderately wide-latitude film, as employed in this study. Similarly, features that are popular in the CR system, such as edge enhancement, can also be obtained with the digital duplication system. The CR system is expensive to purchase and maintain. However, the digital duplication system of the present invention can be installed at relatively low cost, and the running cost is comparable to a conventional duplication system. As shown in Table 1, for most items, the duplication system is comparable or superior to the CR system.

TABLE 1

| | Digital duplication | Computed radiography | Conventional screen-film |
|---|---|---|---|
| Resolution | Good | Fair | Excellent |
| Low frequency MTF | Fair | Good | Good |
| Noise | Good | Poor | Good |
| Dynamic range | Good | Excellent | Poor |
| Image processing | Available | Available | Not applicable |
| Connection to PACS | Available | Available | Not applicable |
| Initial cost | Moderate | High | Low |
| Running cost | Low | High | Low |

According to the present invention, a digital duplication system has been developed by using a laser film digitizer, a high-speed computer, and a laser film printer. The duplication system can recover most films rejected due to under- or over-exposure by using a nonlinear density correction technique. The image quality obtained with this digital duplication system is comparable or slightly superior to that of a storage phosphor computed radiography system. Therefore, it is believed that a digital duplication system will provide an efficient and cost-effective avenue for introduction of PACS into the clinical environment.

Obviously, numerous additional modifications and variations of the present invention are possible in light of the above teachings. While the present invention has been described in relation to correction and duplication of radiographic images, the present invention has utility to the correction and duplication of non-linearly modulated images derived by other means. For example, the present invention can be used to correct DSA images obtained by means of digital subtraction angiography using a non-linear log-amp. Similarly, application of the present invention to ultrasonic and other imaging is anticipated. It is therefore to be understood that within the scope of the appended claims, the invention may be practiced otherwise than as specifically described herein.

What is claimed as new and desired to be secured by letters patent of the United States is:

1. A method of correcting a non-linear characteristic of an image, comprising:
   digitizing said image to produce digital image data representative of said image;
   producing a histogram of said digital image data;
   extracting from said histogram at least a first pixel value characteristic of an imaging input condition under which the image was derived;
   storing in a memory a plurality of non-linear correction curves relating original pixel values to corrected pixel values for different degrees of said imaging input condition;
   selecting a particular one of said correction curves stored in said memory based at least in part on said first extracted pixel value and a predetermined corrected pixel value;
   forming corrected image data utilizing said selected correction curve by correcting each original pixel value of said image to a respective corrected pixel value based on the relationship therebetween defined by said selected correction curve; and
   producing a non-linearity corrected image based on said corrected image data.

2. A method according to claim 1, wherein said producing step comprises:
   producing said histogram from a predetermined image area within said digital image data.

3. A method according to claim 1, wherein:
   said extracting step comprises extracting from said histogram a second pixel value defining a predetermined fraction of pixel values of said histogram having a value less than said second pixel value when the extracted first pixel value is in a predetermined range; and
   said selecting step comprises selecting said predetermined corresponding corrected pixel based on the extracted first and second pixel values when said extracted first pixel value is within said predetermined range.

4. A method according to claim 3, wherein said predetermined range of said first pixel values is a range indicative of overexposure of said image.

5. A method according to claim 4, wherein said extracting step comprises:
   extracting a minimum pixel value of a continuous portion of said histogram as said first extracted pixel value; and
   extracting a pixel value at a 25% fraction of the continuous portion of said histogram as said second extracted pixel value.

6. The method according to claim 5, further comprising:
   performing contrast enhancement on said corrected image data.

7. The method according to claim 6, further comprising:
   performing edge enhancement using unsharp mask filtering on the corrected image data.

8. The method according to claim 5, further comprising:
   performing edge enhancement using unsharp mask filtering on the corrected image data.

9. The method according to claim 1, further comprising:
   performing contrast enhancement on said corrected image data.

10. The method according to claim 9, further comprising:
    performing edge enhancement using unsharp mask filtering on the corrected image data.

11. The method according to claim 1, further comprising:
    performing edge enhancement using unsharp mask filtering on the corrected image data.

12. A system for correcting a non-linear characteristic of an image, comprising
    means for digitizing at last a portion of said image to produce digital image data representative of said image;
    processing means for operating on said digital image data to produce corrected image data, comprising,
    means for producing a histogram of said digital image data,
    means for extracting from said histogram at least a first pixel value characteristic of an imaging input condition under which the image was derived,
    means for storing in a memory a plurality of non-linear correction curves relating original pixel values to corrected pixel values for different degrees of said imaging input condition,
    means for selecting a particular one of said correction curves stored in said memory based at least in part on said first extracted pixel value and a predetermined corrected pixel value, and means for forming corrected image data utilizing said selected correction curve by correcting each original pixel value of said image to a respective corrected pixel value based on the relationship therebetween defined by said selected correction curve; and means for producing a non-linearity corrected image based on said corrected image data.

13. A system according to claim 12, wherein said means for producing a histogram produces said histogram using only selected of the digitized image data corresponding to a predetermined image area of the image.

14. A system according to claim 12, wherein said extracting means comprises:

means for extracting from said histogram a second pixel value defining a predetermined fraction of pixel values of said histogram having a value less than said second pixel value when the extracted first pixel value is in a predetermined range; and said selecting means comprises means for selecting said predetermined corresponding corrected pixel based on the extracted first and second pixel values when said extracted first pixel value is within said predetermined range.

15. A system according to claim 14, wherein said predetermined range of said first pixel values is a range indicative of overexposure of said image.

16. A system according to claim 15, wherein said extracting means comprises:

means for extracting a minimum pixel value of a continuous portion of said histogram as said first extracted pixel value; and means for extracting a pixel value at a 25% fraction of the continuous portion of said histogram as said second extracted pixel value.

17. The system according to claim 16, further comprising:

means for performing contrast enhancement on said corrected image data.

18. The system according to claim 17, further comprising:

means for performing edge enhancement on the corrected image data using unsharp mask filtering.

19. The system according to claim 16, further comprising:

means for performing edge enhancement on the corrected image data using unsharp mask filtering.

20. The system according to claim 12, further comprising:

means for performing contrast enhancement on said corrected image data.

21. The system according to claim 20, further comprising:

means for performing edge enhancement on the corrected image data using unsharp mask filtering.

22. The system according to claim 12, further comprising:

means for performing edge enhancement on the corrected image data using unsharp mask filtering.

* * * * *

UNITED STATES PATENT AND TRADEMARK OFFICE
CERTIFICATE OF CORRECTION

PATENT NO. : 5,224,177
DATED : June 29, 1993
INVENTOR(S) : KUNIO DOI ET AL

It is certified that error appears in the above-indentified patent and that said Letters Patent is hereby corrected as shown below:

In Column 1, after the title and before "BACKGROUND OF THE INVENTION", insert the following paragraph:

--The U.S. Government has a paid-up license in this invention and the right in limited circumstances to require the patent owner to license others under reasonable terms as provided for by the terms of US PHS Grants CA 24806 and CA 47043 awarded by the National Institute of Health.--

Signed and Sealed this

Fourth Day of April, 1995

*Attest:*

BRUCE LEHMAN

*Attesting Officer*      *Commissioner of Patents and Trademarks*